United States Patent
Weston et al.

(10) Patent No.: US 12,287,860 B2
(45) Date of Patent: Apr. 29, 2025

(54) SYSTEMS AND METHODS FOR PERMITTING ACCESS TO A HUMAN MACHINE INTERFACE IN A VEHICLE

(71) Applicant: Ford Global Technologies, LLC, Dearborn, MI (US)

(72) Inventors: Keith Weston, Canton, MI (US); Brendan Diamond, Grosse Pointe, MI (US); Michael Alan Mcnees, Flat Rock, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 239 days.

(21) Appl. No.: 18/153,427

(22) Filed: Jan. 12, 2023

(65) Prior Publication Data
US 2024/0241936 A1 Jul. 18, 2024

(51) Int. Cl.
| | |
|---|---|
| G06F 21/32 | (2013.01) |
| G06F 21/31 | (2013.01) |
| G06F 21/62 | (2013.01) |
| G06V 20/52 | (2022.01) |
| G06V 20/59 | (2022.01) |
| G06V 40/10 | (2022.01) |
| G01S 13/86 | (2006.01) |

(52) U.S. Cl.
CPC ............. *G06F 21/32* (2013.01); *G06F 21/31* (2013.01); *G06F 21/629* (2013.01); *G06V 20/52* (2022.01); *G06V 20/59* (2022.01); *G06V 40/10* (2022.01); *G01S 13/867* (2013.01)

(58) Field of Classification Search
CPC ........ G06F 21/32; G06F 21/31; G06F 21/629; G06V 20/52; G06V 20/59; G06V 40/10; G01S 13/867
See application file for complete search history.

(56) References Cited

U.S. PATENT DOCUMENTS

| | | | |
|---|---|---|---|
| 6,181,996 B1 * | 1/2001 | Chou | B60K 35/22 340/439 |
| 9,545,931 B1 * | 1/2017 | Canale | G06F 16/24 |
| 9,969,268 B2 | 5/2018 | Van Wiemeersch et al. | |
| 2003/0067447 A1 * | 4/2003 | Geaghan | G06F 3/044 345/173 |

(Continued)

OTHER PUBLICATIONS

Ashutosh Mishra et al., In-Cabin Monitoring System for Autonomous Vehicles, Sensors 2000, 22, 4360, Jun. 8, 2022, 1-21.

(Continued)

*Primary Examiner* — Michael Simitoski
(74) *Attorney, Agent, or Firm* — Frank Lollo; Eversheds Sutherland (US) LLP

(57) ABSTRACT

A system for a vehicle configured to be driven by a driver is provided. The vehicle has a human-machine interface (HMI). The system includes an interior sensor suite, a processor electrically connected to the interior sensor suite and the HMI, and a memory. The memory has instructions that, when executed by the processor, cause the processor to perform operations including determine, based on the interior sensor suite, if there is a passenger in the vehicle, determine, when there is a passenger in the vehicle and based on the interior sensor suite, whether the passenger or the driver is attempting to use the HMI, and permit the passenger and not the driver to use the HMI.

20 Claims, 5 Drawing Sheets

(56) References Cited

U.S. PATENT DOCUMENTS

| | | | | |
|---|---|---|---|---|
| 2003/0220725 | A1* | 11/2003 | Harter, Jr. | B60K 35/00 701/1 |
| 2004/0158374 | A1* | 8/2004 | Suzuki | G01C 21/3664 701/532 |
| 2009/0082951 | A1* | 3/2009 | Graessley | G01C 21/3617 701/532 |
| 2009/0088928 | A1* | 4/2009 | Schroeder | G01C 21/3641 701/45 |
| 2009/0160732 | A1* | 6/2009 | Kimura | B60K 35/00 340/425.5 |
| 2010/0250044 | A1* | 9/2010 | Alasry | B60K 37/00 701/31.4 |
| 2011/0025486 | A1* | 2/2011 | Qian | B60Q 9/00 340/438 |
| 2011/0093165 | A1* | 4/2011 | Miller | B60R 22/48 701/36 |
| 2011/0137520 | A1* | 6/2011 | Rector | H04W 28/18 455/418 |
| 2014/0200789 | A1* | 7/2014 | Pietron | B60W 50/085 701/1 |
| 2014/0282931 | A1* | 9/2014 | Protopapas | B60R 25/2081 726/5 |
| 2015/0253753 | A1* | 9/2015 | Bennett | H04M 1/72454 700/83 |
| 2015/0258894 | A1* | 9/2015 | Crowe | B60K 35/10 701/36 |
| 2015/0268746 | A1* | 9/2015 | Cuddihy | G06F 3/041 345/173 |
| 2016/0103499 | A1* | 4/2016 | Yamamoto | G06F 3/04883 345/156 |
| 2016/0147322 | A1* | 5/2016 | Lewis | B60K 35/654 345/173 |
| 2016/0355191 | A1* | 12/2016 | Van Wiemeersch | B60K 35/10 |
| 2017/0203634 | A1* | 7/2017 | Dickow | G08G 1/0967 |
| 2017/0255280 | A1 | 9/2017 | Pacsai et al. | |
| 2018/0072190 | A1* | 3/2018 | Kowalski | B60N 2/0244 |
| 2018/0088661 | A1* | 3/2018 | Betancourt | G06F 3/0227 |
| 2018/0154903 | A1* | 6/2018 | Song | B60W 60/0059 |
| 2018/0157329 | A1* | 6/2018 | Salter | G06F 3/044 |
| 2018/0225875 | A1* | 8/2018 | Yasrebi | G06F 3/011 |
| 2020/0089382 | A1* | 3/2020 | Gray | G06F 21/31 |
| 2020/0192532 | A1 | 6/2020 | Van Wiemeersch et al. | |
| 2020/0249822 | A1* | 8/2020 | Penilla | B60N 2/0025 |
| 2021/0229555 | A1* | 7/2021 | Salahat | B60K 35/60 |
| 2021/0349592 | A1 | 11/2021 | Lemcke et al. | |
| 2022/0019646 | A1* | 1/2022 | Bielby | G06V 10/82 |
| 2022/0058329 | A1* | 2/2022 | Ricci | G06F 21/44 |
| 2023/0131471 | A1* | 4/2023 | Sobecki | B60R 11/04 348/148 |
| 2023/0162634 | A1* | 5/2023 | Kobayashi | G09G 3/003 345/633 |

OTHER PUBLICATIONS

Andreas Pellkofer et al., Emerging Automotive In-Cabin Sensing Solutions for Safety and Comfort, Analog.com, ADI Engineer Zone, 2021, 1-3.

* cited by examiner

SYSTEMS AND METHODS FOR PERMITTING ACCESS TO A HUMAN MACHINE INTERFACE IN A VEHICLE

BACKGROUND

Certain vehicles may include systems which prohibit vehicle occupants from using human-machine interfaces (HMIs) when the vehicles are in motion. These systems do not determine if a driver or a passenger is attempting to interact with the HMI. As such, the systems for these vehicles prohibit both types of vehicle occupants from using the HMI when the vehicle is in motion.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
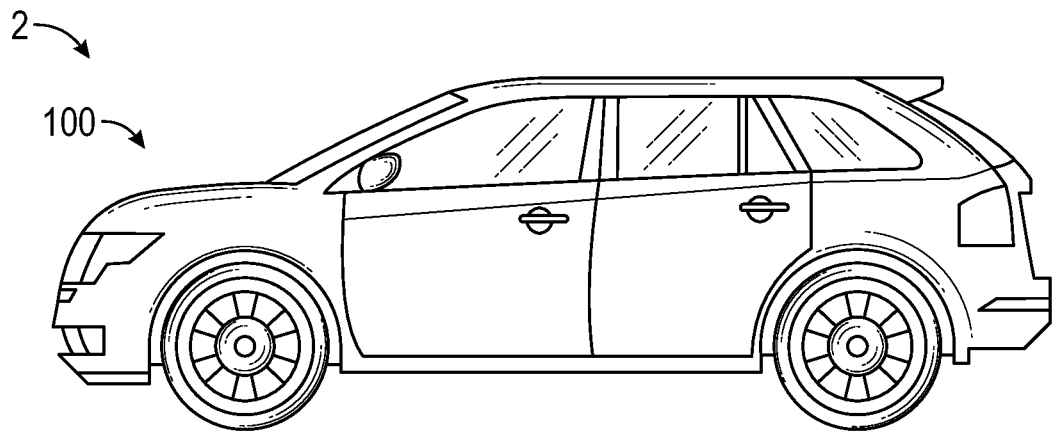
FIG. 1 is side view of a vehicle and system therefor, in accordance with one non-limiting embodiment of the disclosed concept.

The systems, apparatuses, and methods disclosed herein assist passengers in vehicles to use human-machine interfaces (HMIs) of the vehicles. For example, while known systems in vehicles oftentimes prohibit all vehicle occupants from using HMIs of the vehicles while the vehicles are in motion (e.g., in a DRIVE or REVERSE state), systems disclosed herein may permit a passenger and not a driver of the vehicle to use the HMI while the vehicle is in motion. They do this by using an interior sensor suite, which may include a buckles sensor, a weight sensor, a camera, and a radar system, in one example. The interior sensor suite may allow a processor of the vehicle to determine if there is a passenger in the vehicle, to determine whether the passenger or the driver is attempting to use the HMI, and to permit the passenger and not the driver to use the HMI.

Stated differently, the interior sensor suite, or rather the interior monitoring system of the vehicle, monitors the driver and the passenger who may be inside the vehicle. As such, it allows the processor of the vehicle to determine who is attempting to use the HMI. If it determines the passenger is attempting to use the HMI, and the passenger is allowed to use it, the processor may allow the passenger and not the driver to use the HMI, which thus keeps the driver focused on the road while allowing passengers to be able to adjust features of the HMI.

In one example, the passenger is allowed to use the HMI if the driver communicates to the processor a driver preference corresponding to an identity, and the passenger matches that identity. This may also be verified by the camera of the vehicle, which may be configured to scan the face of the passenger and communicate that data to the processor, which can compare it to the driver preference.

In a further example, the interior sensor suite monitors the arm of the driver and the arm of the passenger to determine who is attempting to use the HMI. This data is communicated to the processor, which may be configured to permit the passenger to use the HMI and not permit the driver to use the HMI, when the vehicle is in motion.

In another example, when the vehicle moves from an OFF state to an ON state (e.g., when an ignition of the vehicle is fired on), the HMI of the vehicle may provide a prompt to the driver to activate the system. As such, responsive to the driver issuing an appropriate voice command or pressing a button on the HMI, the system may be activated.

Additionally, the system may also be variable depending on an operating condition of the vehicle. For example, if the vehicle is driving in heavy traffic on a city road, the system may function as described, wherein the passenger is permitted to use the HMI and the driver is not. However, in certain circumstances and when it is safe to do so, the system may function to allow both the driver and the passenger to use the HMI, for example when the vehicle is parked.

These and other advantages of the present disclosure are provided in greater detail herein.

Illustrative Embodiments

FIG. 1 is a side view of a vehicle 2 and system 100 therefor, in accordance with one non-limiting embodiment of the disclosed concept. As will be discussed below, in one example the system 100 is configured to permit a passenger 204 (FIG. 4) and not a driver 202 (FIG. 3A) to use a human-machine interface (HMI) 4 (FIG. 2) of the vehicle 2. That is, the system 100 distinguishes between whether a passenger or a driver is attempting to use the HMI 4 in order to allow certain features of the HMI 4 to be controlled while the vehicle 2 is in motion, and be controlled by an occupant other than the driver 202. In this manner, the HMI 4 of the vehicle 2 may be used without a driver of the vehicle 2 being distracted. Stated differently, passengers of the vehicle 2 are to adjust features of the HMI 4, whereas in certain known systems (not shown), control over HMIs might otherwise be prohibited to all vehicle occupants while the vehicle is in motion.

It will be appreciated that the vehicle 2 may take the form of a passenger or commercial automobile such as, for example, a performance vehicle, a car, a truck, a crossover vehicle, a sport utility vehicle, a van, a minivan, a taxi, a bus, etc., and may be configured and/or programmed to include various types of automotive drive systems. Additionally, in one example embodiment, the vehicle 2 may be configured as an electric vehicle (EV). More particularly, the vehicle 2 may include a battery EV (BEV) drive system or be configured as a hybrid EV (HEV) having an independent onboard powerplant, a plug-in HEV (PHEV) that includes a HEV powertrain connectable to an external power source, and/or includes a parallel or series hybrid powertrain having a combustion engine powerplant and one or more EV drive systems. HEVs may further include battery and/or supercapacitor banks for power storage, flywheel power storage systems, or other power generation and storage infrastructure. The vehicle 2 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

Further, the vehicle 2 may have an autonomous driving system that is configured and/or programmed to operate in a fully autonomous (e.g., driverless) mode (e.g., Level-5 autonomy) or in one or more partial autonomy modes which may include driver assist technologies. Examples of partial autonomy (or driver assist) modes are widely understood in the art as autonomy Levels 1 through 4.

A vehicle having a Level-0 autonomous automation may not include autonomous driving features.

A vehicle having Level-1 autonomy may include a single automated driver assistance feature, such as steering or acceleration assistance. Adaptive cruise control is one such example of a Level-1 autonomous system that includes aspects of both acceleration and steering.

Level-2 autonomy in vehicles may provide driver assist technologies such as partial automation of steering and acceleration functionality, where the automated system(s) are supervised by a human driver that performs non-automated operations such as braking and other controls. In some aspects, with Level-2 autonomous features and greater, a primary user may control the vehicle while the user is inside of the vehicle, or in some example embodiments, from a location remote from the vehicle but within a control zone extending up to several meters from the vehicle while it is in remote operation.

Level-3 autonomy in a vehicle can provide conditional automation and control of driving features. For example, Level-3 vehicle autonomy may include "environmental detection" capabilities, where the autonomous vehicle (AV) can make informed decisions independently from a present driver, such as accelerating past a slow-moving vehicle, while the present driver remains ready to retake control of the vehicle if the system is unable to execute the task.

Level-4 AVs can operate independently from a human driver, but may still include human controls for override operation. Level-4 automation may also enable a self-driving mode to intervene responsive to a predefined conditional trigger, such as a road hazard or a system event.

Level-5 AVs may include fully autonomous vehicle systems that require no human input for operation, and may not include human operational driving controls.

Figure 2:
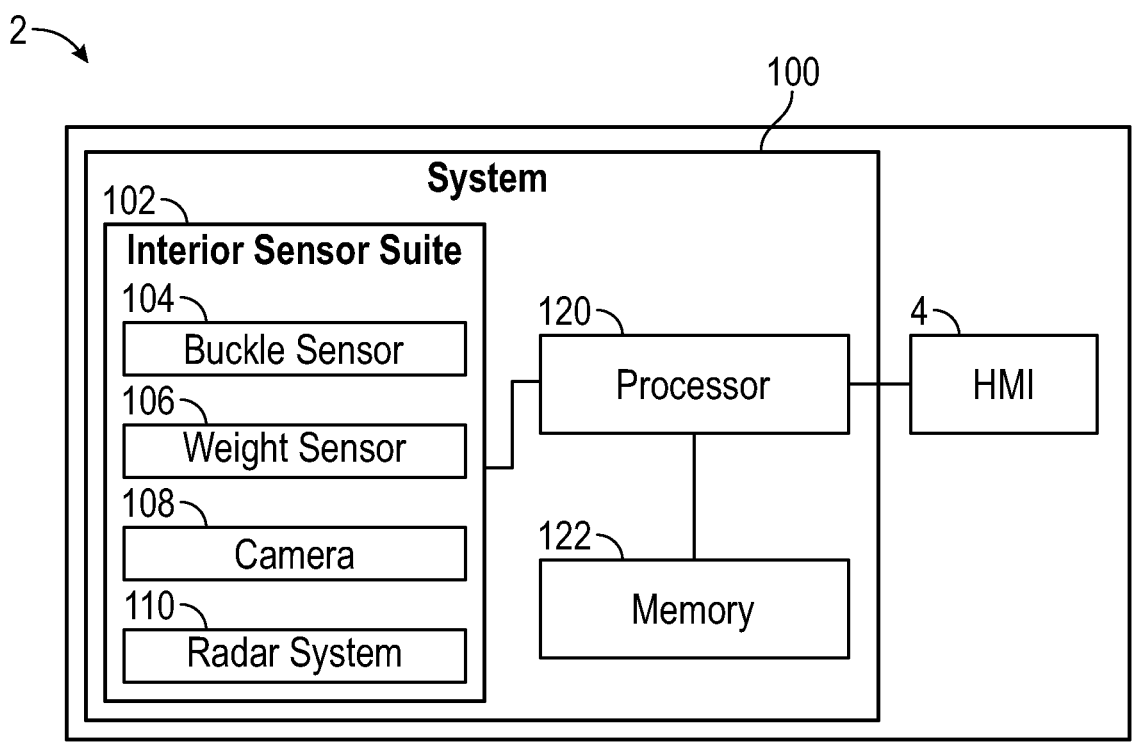
FIG. 2 is a simplified view of the vehicle and system therefor of FIG. 1.

FIG. 2 shows a simplified view of the vehicle 2 and system 100 therefor. As shown, the vehicle 2 includes the HMI 4, and the system 100 includes an interior sensor suite 102, a processor 120, and a memory 122. The HMI 4 may be in the form of a digital screen that can be interfaced with, for example by pressing buttons. The processor 120 of the vehicle 2 may be a commercially available general-purpose processor, such as a processor from the Intel® or ARM® architecture families. The memory 122 of the vehicle 2 may be a non-transitory computer-readable memory storing program code, and can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

In one example, the processor 120 is electrically connected to the interior sensor suite 102 and the HMI 4. Additionally, as shown, the interior sensor suite 102 may include a buckle sensor 104, a weight sensor 106, a camera 108, and a radar system 110 each electrically connected to the processor 120. The buckle sensor 104 and the weight sensor 106 may determine a buckle status and a weight status, respectively, of the position of the vehicle 2 associated with the driver and passenger, and communicate in turn with the processor 120. Similarly, the camera 108 (e.g., an interior camera of the vehicle 2) and the radar system 110 (e.g., occupant sensing radar) can monitor body positions, facial features, and the like of drivers and passengers of the vehicle 2. As will be discussed below, these aspects of the interior sensor suite 102 are configured to provide the system 100 with a number of advantages.

For example, the memory 122 of the system 100 may include instructions that, when executed by the processor 120, cause the processor 120 to perform operations including determine, based on the interior sensor suite 102, if there is a passenger in the vehicle 2, determine, when there is a passenger in the vehicle 2 and based on the interior sensor suite 102, whether the passenger or the driver is attempting to use the HMI 4, and permit the passenger and not the driver to use the HMI 4. The memory 122 may also include instructions that, when executed by the processor 120, cause the processor 120 to perform the operation including determine whether the passenger 204 (FIG. 4) is allowed to use the HMI 4.

It is contemplated that the aforementioned operations of the processor 120 (e.g., determining, based on the interior sensor suite 102, if there is a passenger in the vehicle 2, etc.) may be performed while the vehicle 2 is in motion. For example, the vehicle 2 may have a DRIVE state and a REVERSE state, and being in motion may occur when the vehicle 2 is in the DRIVE state or the REVERSE state.

Determining that there is a passenger in the vehicle 2 is important because the system 100 is configured in order to permit, when appropriate, a passenger to use the HMI 4. This is desirable as compared to known systems because, as stated above, known systems often prohibit all vehicle occupants (e.g., drivers and passengers) from using HMIs when the vehicle is in motion. Accordingly, the system 100 of the disclosed concept determines there is a passenger in the vehicle 2 by, in one example, employing each of the buckle sensor 104, the weight sensor 106, the camera 108, and the radar system 110. Once it is determined by the processor 120, based on data from the interior sensor suite 102, that there is a passenger in the vehicle 2, the system 100 determines who is attempting to use the HMI 2. See FIGS. 3A-4, for example.

Figure 3A:
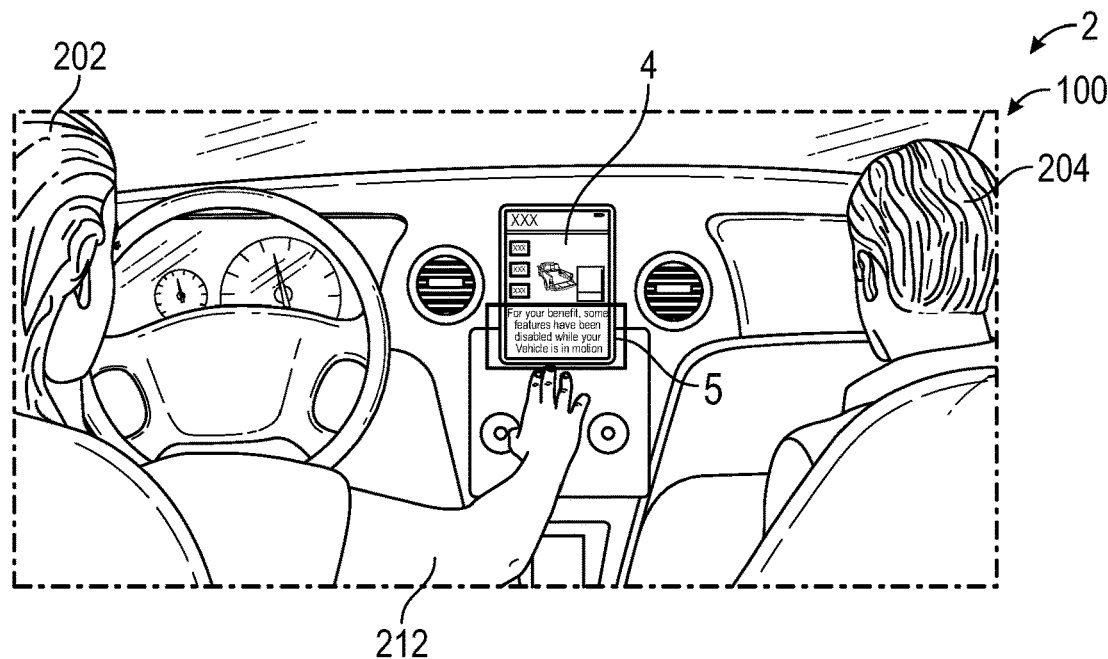
FIG. 3A is a view of an interior of the vehicle and system therefor of FIG. 1, and is shown with a driver attempting to use a human-machine interface (HMI) of the vehicle.
Figure 3B:
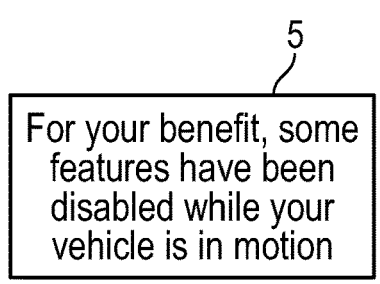
FIG. 3B is an enlarged view of a portion of the HMI of FIG. 3A.

As shown in FIG. 3A, the driver 202 is attempting to reach for the HMI 4. In one embodiment of the disclosed concept, the driver 202 will not be permitted to use (e.g., interface—touch or otherwise communicate with) the HMI 4 when the vehicle is in motion. For example, as shown in FIG. 3B, the HMI 4 may provide a readout 5 responsive to the driver 202 attempting to use the HMI 4 which reads, "For your benefit, some features have been disabled while your vehicle is in motion." This readout 5 and associated blocking of the driver 202 is desirable so that the driver 202 will continue to focus on the road.

However, in addition to blocking the driver 202 from using the HMI 4 when the vehicle 2 is in motion (e.g., in a DRIVE or REVERSE state), the system 100 is configured to simultaneously permit a passenger 204 (FIG. 4) to use the HMI 4. In other words, the system 100 monitors and distinguishes between the driver 202 and the passenger 204 in order to ensure that the driver 202 remain focused on the road, while at the same time providing another occupant of the vehicle 2 (e.g., the passenger 204) with the opportunity to make adjustments to the HMI 4 (e.g., press buttons of, for example, speed dependent features).

Figure 4:
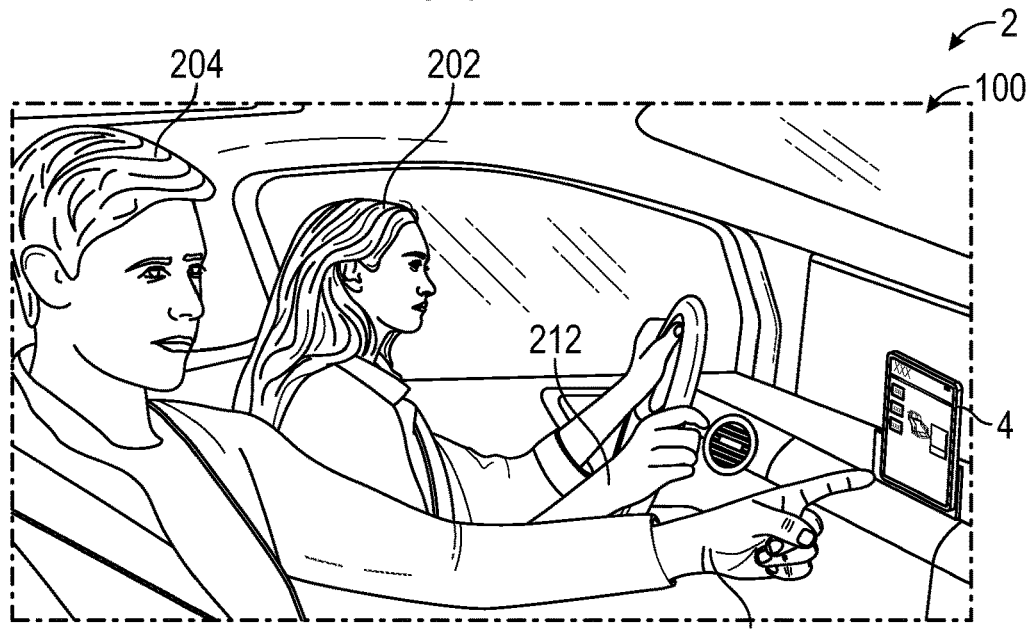
FIG. 4 is another view of the interior of the vehicle and system therefor of FIG. 1, and is shown with a passenger attempting to use the HMI.

This may be achievable via the camera 108 and the radar system 110. Specifically, determining there is a passenger in the vehicle 2 may include employing the camera 108 and the radar system 110 to monitor the passenger (e.g., see passenger 204 in FIGS. 3A and 4) and the driver 202 (FIGS. 3A and 4). In one specific example, the system 100 employs the camera 108 and the radar system 110 to monitor an arm 214 (FIG. 4) of the passenger 204 and an arm 212 (FIG. 4) of the driver 202, with respect to other interior structures (e.g., a center console) of the vehicle 2. Stated differently, the camera 108 and the radar system 110 can determine which of the arms 212,214 is attempting to use the HMI 4, and communicate associated data to the processor 120 (FIG. 2) of the vehicle 2. Additionally or alternatively, the camera 108 may monitor other body positions of the driver 202 and the passenger 204 with respect to internal structures (e.g., a center console) of the vehicle 2. In turn, the processor 120 may permit one occupant (e.g., the passenger 204) and not another (e.g., the driver 202) from using the HMI 4. The driver 202 will focus on the road (e.g., not get distracted) while allowing the non-driving passenger 204 to use (e.g., operate, interact with, press buttons on, etc.) the HMI 4.

Continuing to refer to FIGS. 2-4, it also contemplated that only certain passengers may be permitted to use the HMI 4. For example, if the driver 202 has several children, some of whom are very young and some of whom are older, the driver 202 may want to program the system 100 such that only the older, more responsible children will be permitted to use the HMI 4. That is, the driver 202 may believe that the younger children might distract the driver 202 if they are to use (e.g., interface with) the HMI 4. As such, determining whether the passenger is allowed to use the HMI 4 may include receiving a driver preference corresponding to an identity. That is, the driver 202 may send a communication to the processor 120 (e.g., via a mobile device or otherwise) indicating the driver preference (e.g., permit the passenger 204 to use the HMI and/or permit other specified individuals (not shown) to use the HMI 4) before the vehicle 2 is turned on or otherwise when the vehicle 2 is not in motion. In turn, if a passenger other than the passenger 204 does not correspond to the identity of the driver preference, the system 100 may not, in one alternative example, permit that passenger to use the HMI 4.

Additionally, determining whether the passenger 204 is allowed to use the HMI 4 may also include identifying the passenger 204 with the camera 108. For example, the camera 108 may scan a face of the passenger 204, and with facial recognition technologies communicate an identity of the passenger 204 to the processor 120, which may in turn permit the passenger 204 to use the HMI 4.

The aforementioned examples have been described in association with the driver 202 and the passenger 204 attempting to use the HMI 4. It is contemplated that a feature of the HMI 4 which may be allowed for the passenger 204 and not the driver 202 may be a speed dependent feature (e.g., without limitation, syncing/connecting via Bluetooth your phone to the vehicle, watching a movie/playing a game on the infotainment screen, texting on the infotainment screen, and/or allowing a passenger to enter a navigation destination address, POI (Point Of Interest), etc.). In other examples, other features of the HMI 4 may be permitted for the passenger 204 and not the driver 202.

It is also contemplated that the system 100 is configured for use when the vehicle 2 is in an ON state. For example, the vehicle 2 has an OFF state and an ON state. The vehicle 2 may require a traditional key to start, and may be in an OFF state when the traditional key is not in the ignition and/or when the key is in the ignition, but the ignition has not been ignited—e.g., when the key has been turned an insufficient number of clicks and the engine has not been ignited on. Alternatively, if the vehicle 2 requires, for example, a wireless key and start button (e.g., where pushing the brake and pressing the start button in proximity with the key starts the engine), the vehicle 2 may be in an OFF state when the start button is not being pressed with the key in a predetermined proximity to the start button, and may also include the key not being in predetermined proximity to the start button at all.

When the vehicle 2 moves from the OFF state to the ON state, the HMI 4 may provide a prompt to the driver 202 to activate the system 100. In this manner, once the driver 202 activates the system 100 (e.g., via a suitable command (button pressing, voice, or otherwise) to the HMI 4), the processor 120 (FIG. 2) may be configured to perform the aforementioned operations, and thus allow the HMI 4 to be used by the passenger 204 and not the driver 202.

Figure 5:
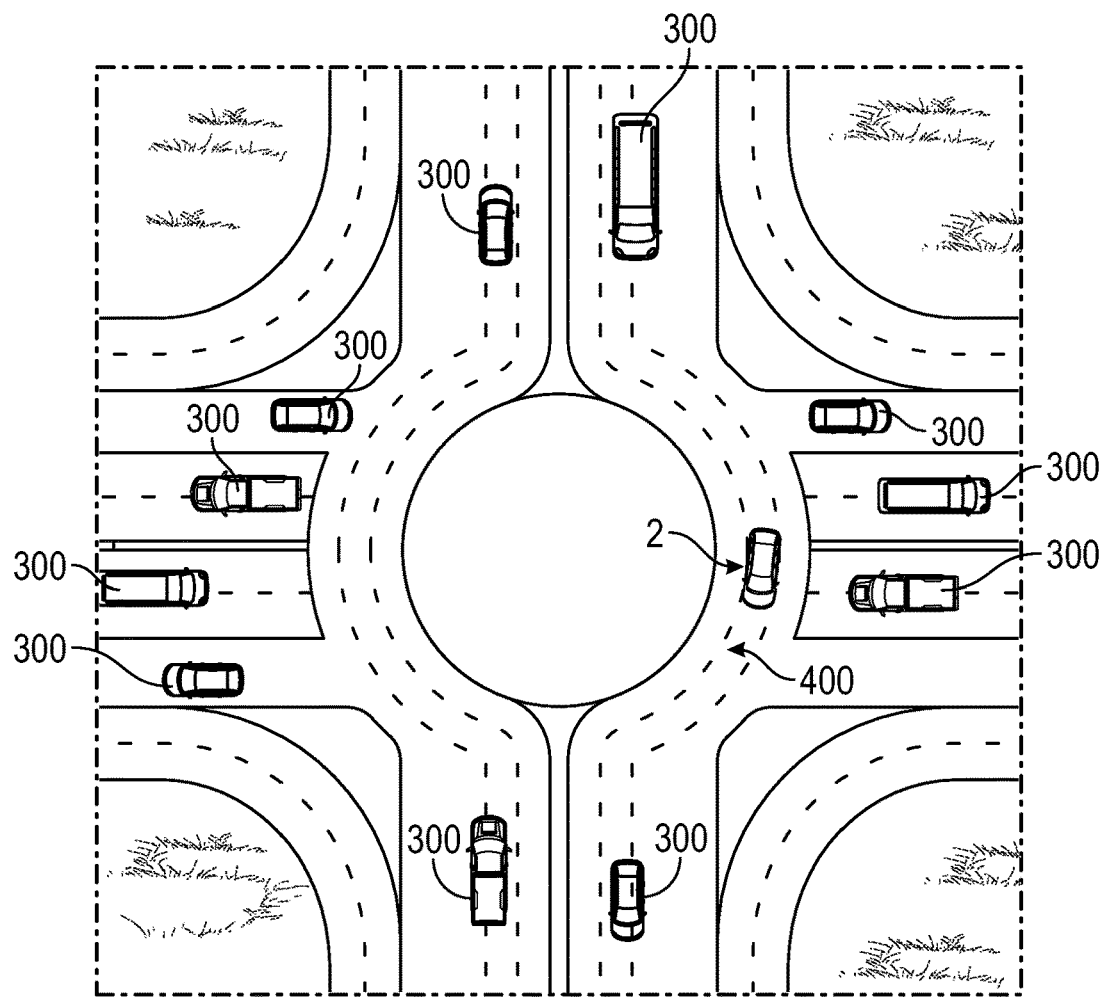
FIG. 5 shows a top plan view of the vehicle and system therefor of FIG. 1, and is shown with the vehicle driving through a crowded intersection.

Additionally, it is also contemplated that the aforementioned operations of the processor 120 may be performed with the vehicle 2 in a FIRST condition. For example, permitting the passenger 204 and not the driver 202 to use the HMI 4 may be performed with the vehicle 2 in the FIRST condition depicted in FIG. 5. As shown in FIG. 5, the vehicle 2 is surrounded by a large number of other vehicles 300 while driving on a road 400 (e.g., heavy traffic). Compare the condition of FIG. 5 to the condition of FIG. 6.

Figure 6:
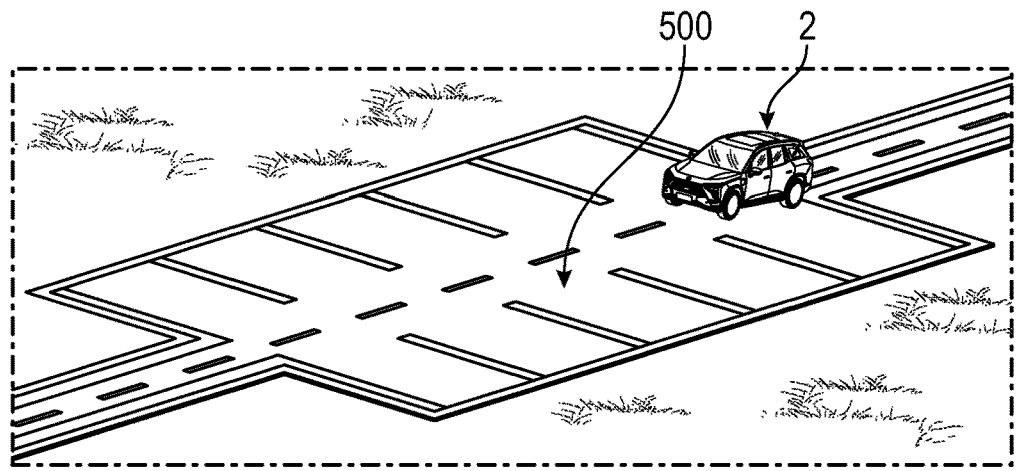
FIG. 6 shows an isometric view of the vehicle and system therefor of FIG. 1, and is shown with the vehicle driving through an empty parking lot.

As shown in FIG. 6, the vehicle 2 is in a SECOND condition wherein the vehicle 2 is driving in an empty parking lot 500. In such a condition, it may be desirable for the system 100 to permit the driver 202 to use the HMI 4. That is, since there are not many (e.g., none in the example of FIG. 6) other vehicles near the vehicle 2 in FIG. 6, permitting the driver 202, as well as the passenger 204, to use the HMI is not overly concerning. Accordingly, the memory 122 of the system 100 may further include instructions that, when executed by the processor 120, cause the processor 120 to perform the operation including permitting the passenger 204 and the driver 202 to use the HMI 4 when the vehicle 2 is in the SECOND condition (FIG. 6). Therefore, the FIRST and SECOND conditions, which are different from one another, may be based on a road on which the vehicle 2 is driving and a traffic pattern in which the vehicle 2 is driving.

Figure 7:
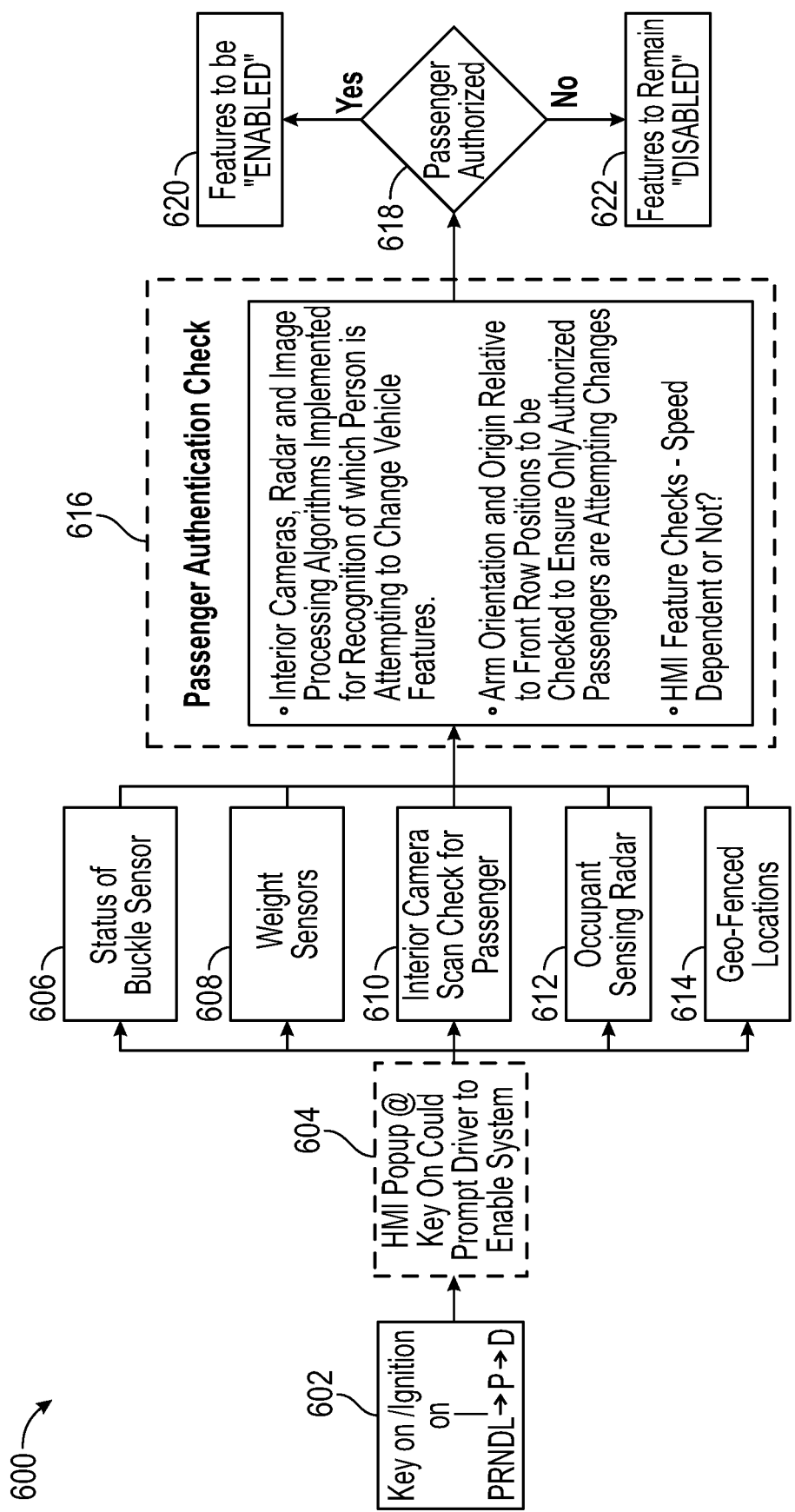
FIG. 7 is a flow chart corresponding to passenger authentication for the vehicle and system therefor of FIG. 1.

FIG. 7 is an example flow chart 600 corresponding to passenger authentication for the vehicle 2 and system 100 therefor of FIG. 1. In a first step 602, the ignition may be turned on (e.g., when the vehicle 2 moves from a PARK state to a DRIVE state). In a second step 604, the HMI 4 could display a pop-up (e.g., a prompt) asking the driver if he or she wants to enable the system 100. Subsequently, in steps 606,608,610,612, the buckle sensor 104, the weight sensor 106, the camera 108, and the radar system 110 can be employed to perform the aforementioned operations of the system 100. Additionally, regarding the step 614, the processor 120 of the system 100 may be configured to scan for geo-fenced locations (e.g., determine whether the vehicle 2 is in a FIRST condition (FIG. 5) or a SECOND condition (FIG. 6)). Subsequently, at a step 616, the processor 120 performs operations including determining who is attempting to change features on the HMI 4, checking an orientation of the arms 212,214 of the driver 202 and the passenger 204, and determining if the features of the HMI 4 are speed dependent or not. Finally, at a step 618, it is determined whether the passenger 204 is authorized. If so, a step 620 enables the feature of the HMI 4, and if not, a step 622 disables the feature of the HMI 4.

Figure 8:
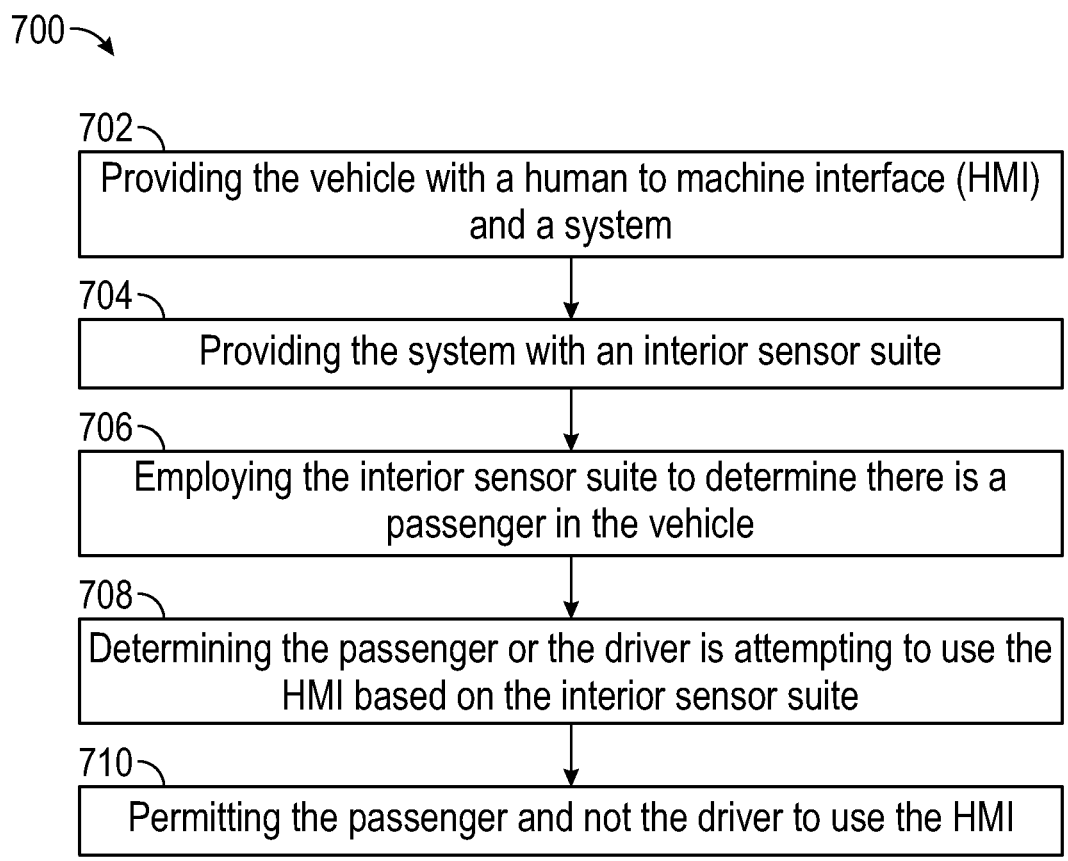
FIG. 8 is an example operating method for the vehicle and system therefor of FIG. 1.

FIG. 8 shows an example operating method 700 for the vehicle 2. As shown, the method 700 includes a first step 702 of providing the vehicle 2 with a HMI 4 and a system 100, a second step 704 of providing the system 100 with an interior sensor suite 102, a third step 706 of employing the interior sensor suite 102 to determine there is a passenger 204 in the vehicle 2, a fourth step 708 of determining the passenger 204 or the driver 202 is attempting to use the HMI 4 based on the interior sensor suite 102, and a fifth step 710 of permitting the passenger 204 and not the driver 202 to use the HMI 4.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A system for a vehicle configured to be driven by a driver, the vehicle comprising a human-machine interface (HMI), the system comprising:
   an interior sensor suite;
   a processor electrically connected to the interior sensor suite and the HMI; and
   a memory comprising instructions that, when executed by the processor, cause the processor to perform operations comprising:
      receive, from a mobile device associated with the driver, a first communication comprising a first driver preference corresponding to a first identity of a first passenger,
      determine, based on the interior sensor suite, that the first passenger is in the vehicle,
      determine, based on the interior sensor suite, that the first passenger is attempting to use the HMI and matches the first identity,
      determine, based on the first driver preference and the interior sensor suite, that the first passenger is allowed to use the HMI, and
      permit the first passenger and not the driver to use the HMI.

2. The system according to claim 1, wherein the memory further comprises instructions that, when executed by the processor, cause the processor to perform operations comprising:
   receive, from the mobile device associated with the driver, a second communication comprising a second driver preference corresponding to a second identity of a second passenger, determine, based on the interior sensor suite, that the second passenger is in the vehicle, determine, based on the interior sensor suite, that the second passenger is attempting to use the HMI, determine, based on the second driver preference and the interior sensor suite, that the second passenger is not allowed to use the HMI, and prevent the second passenger from using the HMI.

3. The system according to claim 1, wherein the interior sensor suite comprises a buckle sensor, a weight sensor, a camera, and a radar system each electrically connected to the processor, and wherein determine, based on the interior sensor suite, that the first passenger is in the vehicle comprises employing each of the buckle sensor, the weight sensor, the camera, and the radar system to determine that the first passenger is in the vehicle.

4. The system according to claim 1, wherein the interior sensor suite comprises a camera and a radar system each electrically connected to the processor, and wherein determine, based on the interior sensor suite, that the first passenger is attempting to use the HMI comprises employing the camera and the radar system to monitor the first passenger and the driver.

5. The system according to claim 4, wherein determine, based on the first driver preference and the interior sensor suite, that the first passenger is allowed to use the HMI comprises determining that the first driver preference comprises a permission corresponding to the first identity.

6. The system according to claim 4, wherein determine, based on the first driver preference and the interior sensor suite, that the first passenger is allowed to use the HMI comprises identifying the first passenger with the camera.

7. The system according to claim 4, wherein permit the first passenger and not the driver to use the HMI is performed with the vehicle in a FIRST condition, wherein the memory further comprises instructions that, when executed by the processor, cause the processor to perform the operation comprising permitting the first passenger and the driver to use the HMI when the vehicle is in a SECOND condition, wherein the SECOND condition is different than the FIRST condition, and wherein the FIRST and SECOND conditions are based on a road on which the vehicle is driving and a traffic pattern in which the vehicle is driving.

8. The system according to claim 4, wherein employing the camera and the radar system comprises monitoring an arm of the first passenger and an arm of the driver.

9. The system according to claim 4, wherein the vehicle further has an OFF state and an ON state, and wherein, when the vehicle moves from the OFF state to the ON state, the HMI provides a prompt to the driver to activate the system.

10. A vehicle configured to be driven by a driver, the vehicle comprising:
a human-machine interface (HMI);
an interior sensor suite;
a processor electrically connected to the interior sensor suite and the HMI; and
a memory comprising instructions that, when executed by the processor, cause the processor to perform operations comprising:
receive, from a mobile device associated with the driver, a first communication comprising a first driver preference corresponding to a first identity of a first passenger,
determine, based on the interior sensor suite, that the first passenger is in the vehicle,
determine, based on the interior sensor suite, that the first passenger is attempting to use the HMI and matches the first identity,
determine, based on the first driver preference and the interior sensor suite, that the first passenger is allowed to use the HMI, and
permit the first passenger and not the driver to use the HMI.

11. The vehicle according to claim 10, wherein determine, based on the interior sensor suite, that the first passenger is in the vehicle is performed while the vehicle is in motion.

12. The vehicle according to claim 11, wherein the vehicle has a REVERSE state and a DRIVE state, and wherein the vehicle is in motion when the vehicle is in the REVERSE state or in the DRIVE state.

13. The vehicle according to claim 10, wherein the memory further comprises instructions that, when executed by the processor, cause the processor to perform operations comprising:
receive, from the mobile device associated with the driver, a second communication comprising a second driver preference corresponding to a second identity of a second passenger,
determine, based on the interior sensor suite, that the second passenger is in the vehicle,
determine, based on the interior sensor suite, that the second passenger is attempting to use the HMI,
determine, based on the second driver preference and the interior sensor suite, that the second passenger is not allowed to use the HMI, and
prevent the second passenger from using the HMI.

14. The vehicle according to claim 10, wherein the interior sensor suite comprises a camera and a radar system each electrically connected to the processor, and wherein determine, based on the interior sensor suite, that the first passenger is attempting to use the HMI comprises employing the camera and the radar system to monitor the first passenger and the driver.

15. The vehicle according to claim 14, wherein permit the first passenger and not the driver to use the HMI is performed with the vehicle in a FIRST condition, wherein the memory further comprises instructions that, when executed by the processor, cause the processor to perform the operation comprising permitting the first passenger and the driver to use the HMI when the vehicle is in a SECOND condition, wherein the SECOND condition is different than the FIRST condition, and wherein the FIRST and SECOND conditions are based on a road on which the vehicle is driving and a traffic pattern in which the vehicle is driving.

16. An operating method for a vehicle configured to be driven by a driver, the method comprising the steps of:
providing the vehicle with a human-machine interface (HMI) and a system;
providing the system with an interior sensor suite;
receiving, from a mobile device associated with the driver, a first communication comprising a first driver preference corresponding to a first identity of a first passenger;
employing the interior sensor suite to determine that the first passenger is in the vehicle;
determining, based on the interior sensor suite, that the first passenger is attempting to use the HMI and matches the first identity;

determining, based on the first driver preference and the interior sensor suite, that the first passenger is allowed to use the HMI; and permitting the first passenger and not the driver to use the HMI.

17. The method according to claim 16, wherein the vehicle further has an OFF state and an ON state, and wherein, based on the vehicle moving from the OFF state to the ON state, the method further comprises the step of providing a prompt to the driver with the HMI to activate the system.

18. The method according to claim 16, further comprising the steps of:

receiving, from the mobile device associated with the driver, a second communication comprising a second driver preference corresponding to a second identity of a second passenger;

determining, based on the interior sensor suite, that the second passenger is in the vehicle;

determining, based on the interior sensor suite, that the second passenger is attempting to use the HMI;

determining, based on the second driver preference and the interior sensor suite, that the second passenger is not allowed to use the HMI; and preventing the second passenger from using the HMI.

19. The method according to claim 16, wherein the interior sensor suite comprises a camera and a radar system, and wherein determining, based on the interior sensor suite, that the first passenger is attempting to use the HMI comprises employing the camera and the radar system to monitor the first passenger and the driver.

20. The method according to claim 18, wherein permitting the first passenger and not the driver to use the HMI is performed with the vehicle in a FIRST condition, wherein the method further comprises permitting the first passenger and the driver to use with the HMI with the vehicle in a SECOND condition, wherein the SECOND condition is different than the FIRST condition, and wherein the FIRST and SECOND conditions are based on a road on which the vehicle is driving and a traffic pattern in which the vehicle is driving.

* * * * *